United States Patent
Solomon et al.

(10) Patent No.: US 6,854,033 B2
(45) Date of Patent: Feb. 8, 2005

(54) USING LINKED LIST FOR CACHES WITH VARIABLE LENGTH DATA

(75) Inventors: Baruch Solomon, Zichron Yaakov (IL); Avi Mendelson, Haifa (IL)

(73) Assignee: Intel Corporation, Santa Clara, CA (US)

( * ) Notice: Subject to any disclaimer, the term of this patent is extended or adjusted under 35 U.S.C. 154(b) by 413 days.

(21) Appl. No.: 09/895,693

(22) Filed: Jun. 29, 2001

(65) Prior Publication Data

US 2003/0005230 A1 Jan. 2, 2003

(51) Int. Cl.[7] .................................................. G06F 12/08
(52) U.S. Cl. ........................... 711/3; 711/119; 711/206
(58) Field of Search ............................ 711/3, 119, 129, 711/206, 207, 209, 212, 126

(56) References Cited

U.S. PATENT DOCUMENTS

| | | | | |
|---|---|---|---|---|
| 4,792,898 A | * | 12/1988 | McCarthy et al. | 711/118 |
| 5,893,148 A | * | 4/1999 | Genduso et al. | 711/132 |
| 6,341,325 B2 | * | 1/2002 | Franaszek et al. | 711/3 |
| 6,353,871 B1 | * | 3/2002 | Benveniste et al. | 711/3 |
| 6,430,666 B1 | * | 8/2002 | Roth | 711/202 |
| 6,453,319 B1 | * | 9/2002 | Mattis et al. | 707/100 |

* cited by examiner

*Primary Examiner*—Gary Portka
(74) *Attorney, Agent, or Firm*—Blakely, Sokoloff, Taylor & Zafman LLP (57) ABSTRACT

In general, the cache structure overcomes the deficiency of wasted tag space and reduces associativity. The method provides for storing a single tag along with a pointer to the actual data which is stored in a separate array which includes several lines. Each data block may have a variable length and occupy several lines. These lines are linked together to form a linked list. An invalidation mechanism allows invalidation of lines of the same data block, increasing data efficiency.

14 Claims, 5 Drawing Sheets

USING LINKED LIST FOR CACHES WITH VARIABLE LENGTH DATA

FIELD

The present invention relates to an apparatus and method for caching data in a computer system. More particularly, the invention relates to a new method of organizing tags and data blocks of variable length in a cache memory resulting in a more efficient use of hardware space and a higher cache hit ratio.

BACKGROUND

A computer system, in its most essential form, typically comprises a processor, a memory unit, and an I/O device with which the computer system communicates with an end-user. The end-user provides the computer system with a program typically comprising a set of instructions or codes directing the processor to perform tasks. Generally, the tasks involve manipulating data that is provided to the computer system by the end-user. Both the data and the codes are stored in the memory unit. The processor reads the codes and the data, manipulates it according to the program, and then stores the result in the memory unit.

Both processors and memory units have become faster as the technology has advanced in the field of electronics. However, the speed with which today's processors are able to execute instructions remains much faster relative to the speed with which the memory units are able to deliver stored data. This difference in speed, referred to as memory latency, causes an inefficiency as the processor remains idle while it is waiting for the slower memory to make the next piece of data available. Reducing memory latency is of great interest to computer users because it will result in improved overall performance of the computer system.

One way to reduce memory latency is to utilize a faster intermediate level of memory known as Cache. A general cache consists of ways, sets and lines. A way is comprises a plurality of sets which in turn includes a plurality of lines, and a line is a container of a fixed length that stores the data. In a single clock cycle, one look-up and one fetch is done, fetching one line from the cache.

Generally, cache stores a tag which identifies a corresponding data. Upon a processor receiving a request for data, a cache controller performs a look-up operation matching an abbreviated portion of the address of the requested data with one or more tags. If the search results in a match, i.e., a cache hit, then the corresponding data in cache is sent to the processor. Otherwise, a cache miss occurs, and the data is transferred from main memory. A look-up operation is costly in terms of power consumption and time savings, and if the data length exceeds the size of a cache line resulting in having to store a referenced data in multiple cache lines, then multiple look-ups are necessary to fully cache the data.

There are several possibilities for organizing the cache structure. One possibility is for each cache line to contain the entire block of data. In this approach, the length of the cache line is sufficient to hold the longest possible data block. This approach can cause substantial inefficiencies in memory usage, since the average length of a block of data is smaller than the cache line length.

Figure 1:
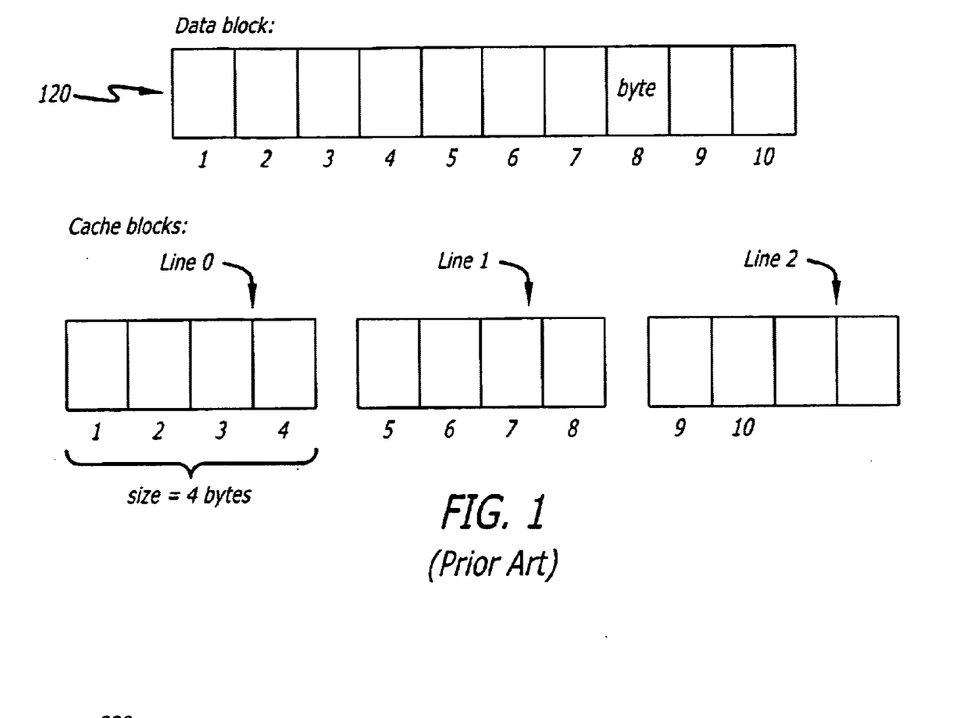
FIG. 1 illustrates a variable data length mapping scheme according to prior art.

Another approach is to divide a block of data and store it in several cache lines, as illustrated in FIG. 1. Data block 120 is 10 bytes long. However, in this example, the size of a cache line is only 4 bytes. Thus in order to store data block 120, three cache lines are needed. In line 0, the first 4 blocks of data are stored. In line 1, the next 4 bytes, and in line 3, the remaining 2 bytes. Since each line has a corresponding tag and only the first line of the block is looked-up, the remaining tags for line 1, and line 2 are wasted because the tag area is not used, and the cache lines that contain the continuation of the data block occupy lines that could be used for other blocks, hence the effective associativity of the cache is reduced. Now, if the data block contains 100 bytes, instead of 10, then 25 lines are required to cache the data block, resulting in storage of 24 additional tags which serve little or no use.

DETAILED DESCRIPTION OF THE INVENTION

In the following detailed description of the invention, numerous specific details are set forth in order to provide a thorough understanding of the invention. However, it will be obvious to one skilled in the art that the invention may be practiced without these specific details. In other instances, well known methods, procedures, components, and circuits have not been described in detail so as not to unnecessarily obscure aspects of the present invention.

The invention includes various functions, which will be described below. The functions of the invention may be performed by hardware components or may be embodied in machine-executable instructions, which may be used to cause a general-purpose processor programmed with the instructions to perform the functions. Alternatively, the functions may be performed by a combination of hardware and software. Importantly, while embodiments of the invention will be described with reference to a trace cache with 4-way set associativity, the method and apparatus described herein are equally applicable to any type of caching strategy and in any memory hierarchy.

The invention relates to a method to overcome the inefficiency of wasted tag space and reduced associativity. The general concept is to store a single tag for a variable length data entity in a separate structure regardless of the size of the cache line or the data length. In one embodiment, a pointer is also stored along with the tag, which identifies the location in which the corresponding data is stored. The data itself is stored in a separate array comprising cache lines. A data array may span several lines, which are linked together to form a link list. An invalidation mechanism allows invalidation of all lines of the same data block, increasing structure efficiency.

Figure 2:
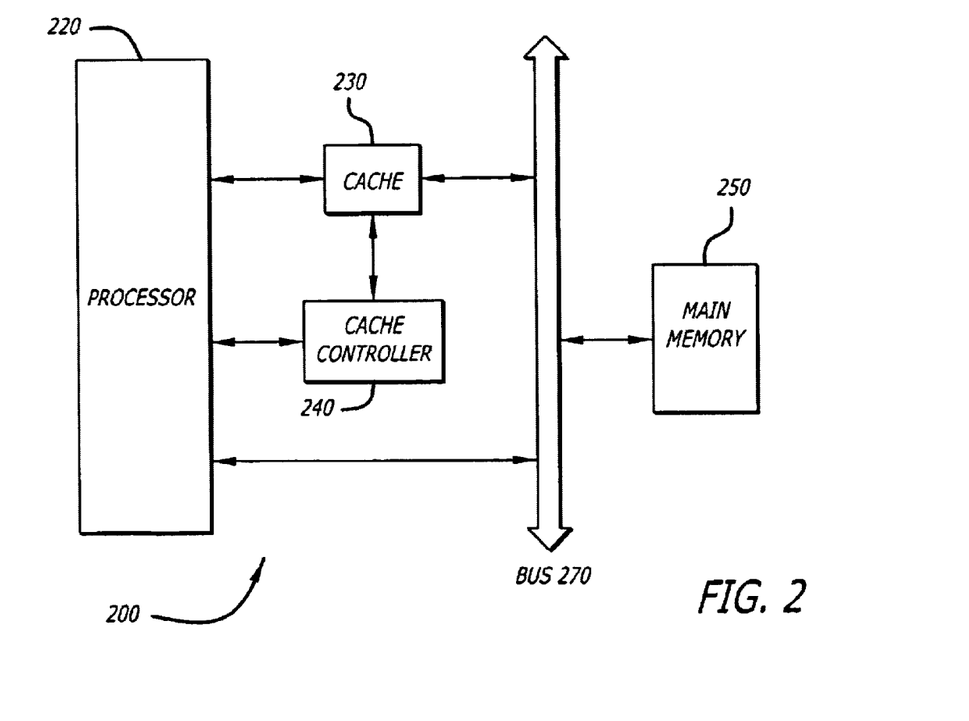
FIG. 2 illustrates a block diagram of an exemplary computer system according to one embodiment of the invention.

Referring now to FIG. 2, a block diagram of an exemplary computer system 200 utilizing the method pursuant to an embodiment of the invention is illustrated. The computer system 200 comprises a processor 220, a cache 230, a cache controller 240, a main memory 250, and a bus 270. When the processor 220 issues a request for data, the request is processed by the cache controller 240. The cache controller 240 determines the corresponding tag associated with a memory address, and then searches the cache 230 for a match. This look-up procedure will determine whether the requested data resides in cache. If a match results, then the cache controller 240 fetches the corresponding data from cache 230 and delivers it to the processor. If the search does not result in a match, then a cache miss has occurred and the cache controller 240 reports this miss to the processor 220 which will in turn fetch the data directly from main memory 250.

Figure 3:
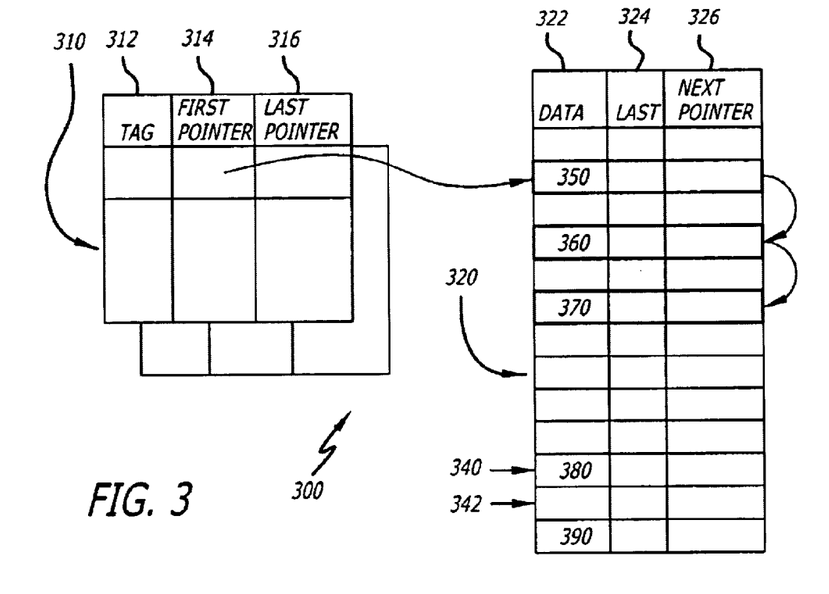
FIG. 3 illustrates an exemplary cache structure with data lines in a separate linked list array according to the method pursuant to the invention is shown.

Referring now to FIG. 3, an exemplary cache structure pursuant to an embodiment of the invention is shown. The cache structure 300 comprises a Block Tag Cache (BTC) 310, and a Block Data Array (BDA) 320. The BTC 310 stores three pieces of information regarding a cache line. The first entry is Tag 312 which is an abbreviated form of the main memory address of the data. The tag address may be formed in accordance with the particular mapping strategy for the cache structure 300. The caching method pursuant to the invention applies to any mapping strategy that is used. For example, the method pursuant to the invention may be implemented with a 2-way set associativity, a 4-way set associativity, or a direct-mapped mapping strategy.

The second entry corresponding to the Tag 312, is a First Pointer 314, which holds the index to the first cache line of the data block. Thus, this information provides an address in the Block Data Array (BDA) where the data corresponding to Tag 312 is stored. Finally, the third piece of information corresponding to Tag 312 is a Last Pointer 316 which provides the address of the last cache line holding the remainder of the data.

Referring still to FIG. 3, an embodiment of the BDA 320 is shown. The BDA 320 also contains three pieces of information for every line entry. The Data 322 is where the data referenced in the BTC 310 is stored. The Last 324 entry indicates whether this line entry is the last entry or whether the data length exceeds one cache line and thus additional lines are necessary for complete storage of the data. Finally, the entry marked Next Pointer 326, indicates the address of the next cache line within the BDA 320 holding the remainder of the data.

By storing the actual data in a separate structure from the tag structure, only one tag is necessary for a look-up operation. This is because the BDA 320 is organized as a linked list of lines, that can be fetched one line per cycle. Each line includes data and a pointer to the next line in the array. The last line of the data block, which is the last line in a linked list, is marked by Last 324.

Another structure is a linked list of free lines in the BDA 320. Two pointers and a counter may be utilized to manage the list. The first pointer is the Free Lines Pointer (FLP) 340. The Last free Lines Pointer (LLP) 342 holds the second of the two pointers. Thus, FLP 340 indicates the address in the BDA 320 where an empty line can be allocated for a new data block that should be stored. And, the LLP 342 indicates the address of the last free line available for storage. Finally, an Empty lines counter may be keeping track of empty lines within the BDA 320 (not shown).

The First Pointer 314, and the Last Pointer 316 are utilized to manage unused lines within BDA 320. When an entry in BTC 310 is released or replaced, its corresponding data lines in BDA 320 may be freed up for newly cached data. The FLP 340 and LLP 342 which contain a free list within BDA 320 are utilized to keep track of free lines in BDA 320. In order to property maintain the free list, a First Pointer 314, and a Last Pointer 316 are used to hold the beginning and the end of a data block within the BDA 320. Similarly, the free list within the BDA 320, also includes the FLP 340, and the LLP 342 to point to the first free line and the last free line respectively.

In one embodiment, the procedure for releasing a block of data in BDA 320, when an entry is replaced in BTC 310, comprises setting the Next Pointer 326 of a line pointed to by the Last Pointer 316 to the First Pointer 314 (the first line of the freed block). Additionally, the LLP 342 will be set to the Last Pointer 316 of the freed block (whose next pointer is null). This procedure normally takes two cycles to complete regardless of the length of the data block.

Figure 4A:
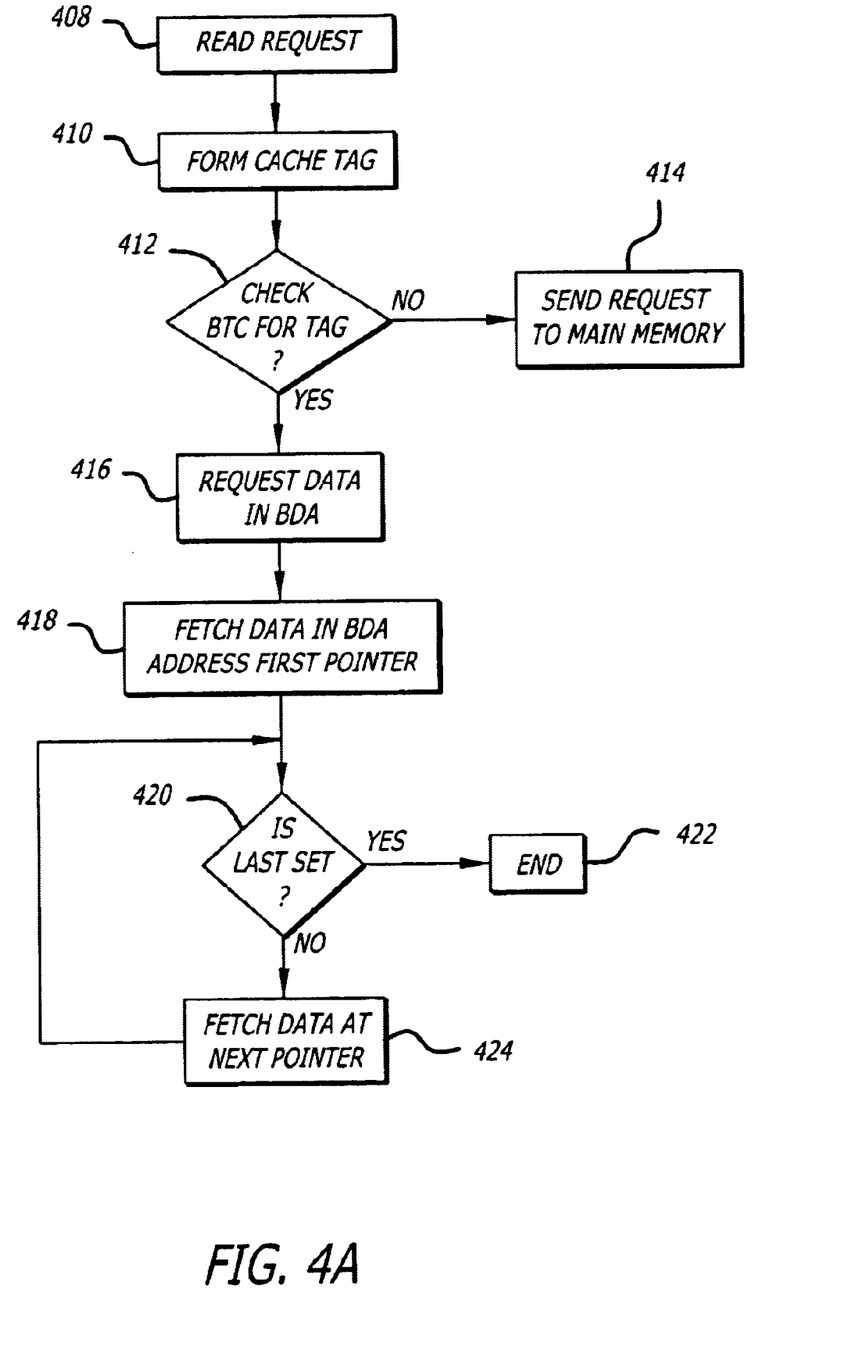
FIG. 4A illustrates a flow diagram of a method to process a memory request from a processor according to the method pursuant to the invention.

Referring now to FIG. 4A, a flow diagram of the method pursuant to an embodiment of the invention is shown. In functional state 408, a cache controller receives a read request from a processor. The request includes a real memory address. In functional state 410, the cache controller identifies the tag corresponding to the memory address. Once the Tag has been formed, in functional state 412, a search of the BTC 310 of FIG. 3 takes place. The Tag 312 field is searched for an entry matching the tag formed in functional state 410. If a match is found, then a cache hit has occurred. However, if no match has been found, then in functional state 414, a cache miss has occurred and the requested data needs be fetched from main memory 250.

In functional state 416, after a determination has been made that the requested data is in the cache, the address in First Pointer 314 is used by the cache controller to reach the data in the BDA 320. The address in First Pointer 314 contains the address of the first line where the requested data is being stored. In functional state 418, the data in Data 322 of BDA 320 is transferred to the processor. Next, in functional state 420, Last 324 is checked to see whether it indicates that there is additional data. In functional state 422, the Last 324 indicates that the current line contained all of the data. In this case, the operation ends as all of the data has been transferred to the processor.

On the other hand, if in functional state 420, Last 324 indicates that there is more data, then the address of the next line of data is read from Next Pointer 326 of BDA 320 (See FIG. 3). In functional state 424, the data is transferred from the address in the Next Pointer 326 register to the processor, and once again Last 324 corresponding to the new line is checked to see whether this is the last line. This loop will continue until all the data has been read and the Last 324 finally indicates this.

Figure 4B:
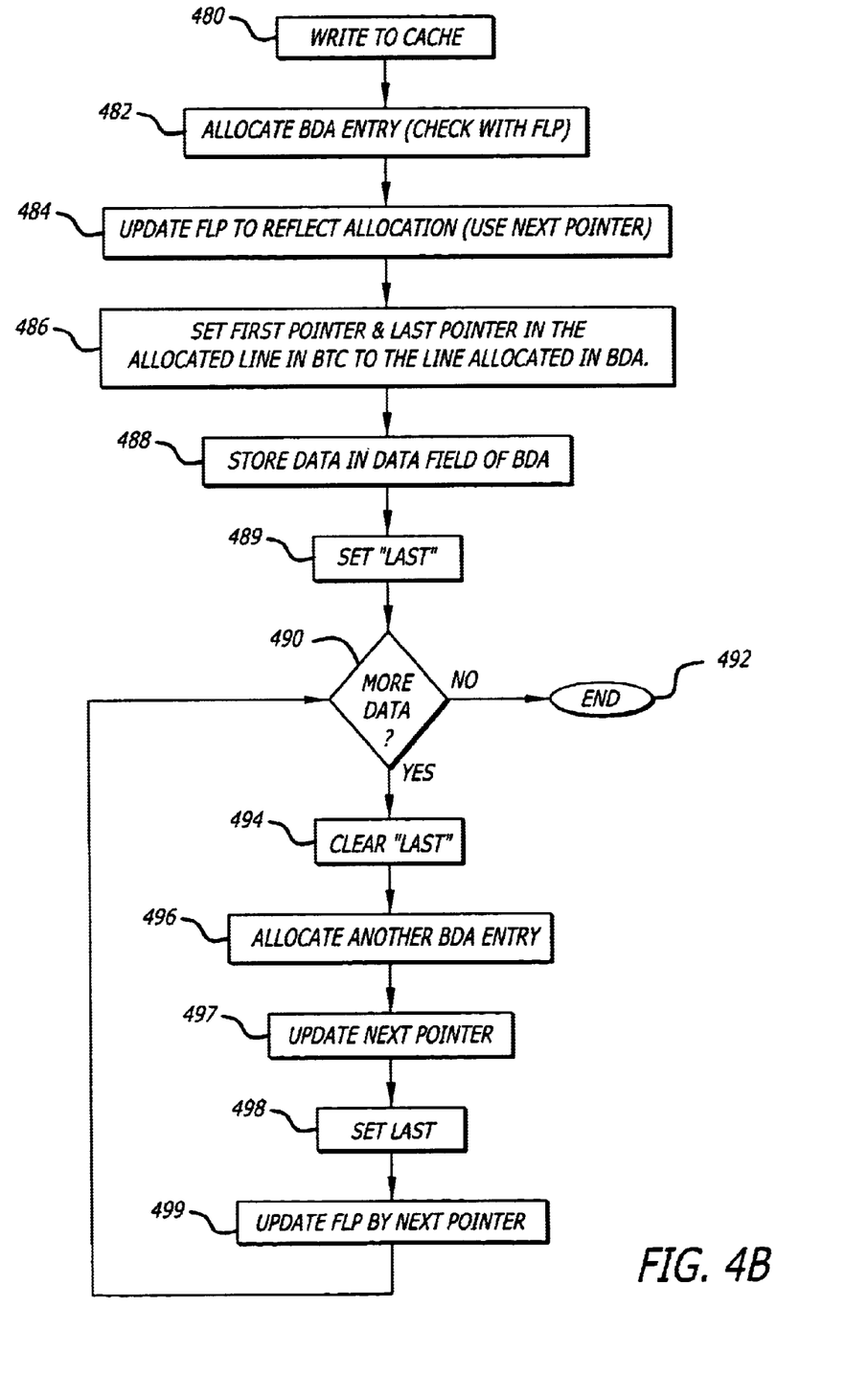
FIG. 4B illustrates a flow diagram of a method to process a write operation to cache memory according to one embodiment of the invention.

Referring now to FIG. 4B, a flow diagram of a write operation to cache memory according to one embodiment of the invention is shown. During functional state 480, a determination is made to write a given data to the cache. In functional state 482, a BDA 320 entry such as entry 350 is allocated for this operation. This allocation may be done, for example, by FLP 340 which keeps track of free lines within the FLP 340.

During functional state 484, the FLP 340 is updated by the Next Pointer 326 of the BDA entry 380. This reflects the allocation made in functional state 482. In order to accomplish this, the Next Pointer 326 may be utilized. In functional state 486, the First Pointer 314, and the Last Pointer 316 in the allocated line in BTC 310 is set to the line allocated in BDA 320. Next, during functional state 488, the data to be written into the cache is stored in data field 322. For example, the data may be stored in data line 350 in BDA 320. Finally, the Last 324 bit is set to indicate that this line is the only line of data for the entry at 350.

During functional state 490, a determination is made as to whether there is additional data to be stored along with data 350 field. In other words, the querry is regarding the length of the data to be written into the cache. If the data length is longer than what may be fitted in one line, i.e., 350, then the result of the inquiry at functional state 490 is "yes" otherwise the write operation comes to an end as indicated in functional state 492.

During functional state 494, the Last 324 is reset or cleared to indicate that there is more data to be stored. During functional state 496, a subsequent BDA 320 entry is allocated such as data 360. In functional state 497, the Next Pointer 326 of the corresponding entry is updated to reflect the linked line. In functional state 498, the Last 324 is once again set to indicate that the data 360 contains the last line of data. In functional state 499, the FLP 340 is updated once again by the Next Pointer 326 of the entry 390. This loop will continue until there is no more data left in the write operation.

Figure 5:
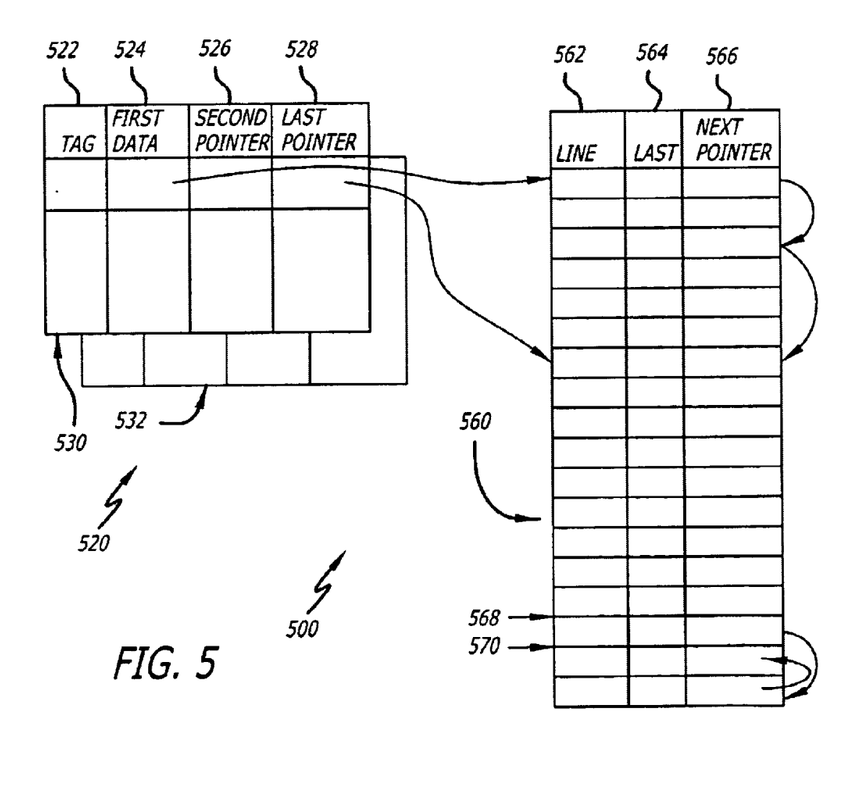
FIG. 5 illustrates an exemplary cache structure with data lines in a separate linked list array according to the method pursuant to the invention is shown.

Referring now to FIG. 5, another variation of the cache structure 500 according to the method pursuant to an embodiment of the invention is illustrated. The cache structure 500 comprises a Block Head Cache (BHC) 520 and a Block Tail Array (BTA) 560. The BHC 520 includes a plurality of ways such as way 530, and way 532. Way 530 comprises Tag 522, First Data 524, Second Pointer 526, and Last Pointer 528. Tag 522 is the tag address corresponding to a given data. First Data 524, is the actual data associated with Tag 522. The Second Pointer 526 provides the location within the BTA 560 where the next line of data is stored. The Last Pointer 528 indicates whether there is a next line with data, or whether the current line is the last line of data.

The BTA 560 comprises several entries. Each entry includes Line 562, Last 564, and Next Pointer 566. Line 562 contains the data corresponding to a Tag address. The Last 564 entry may be simply a bit which if set, it can mean that the current entry is the last entry. If, however, the Last 564 is not set, then this means that there is more data, and Next Pointer 566 provides the address of the entry in BTA 560 where the remainder of data is contained. The BTA 560 also has an entry marked Free Line Pointer (FLP) 568 which provides a pointer to the BTA 560 location with available data. In this embodiment, the tag and the first line of data is stored in BHC 520 while the remainder of the data is stored in BTA 560.

Figure 6:
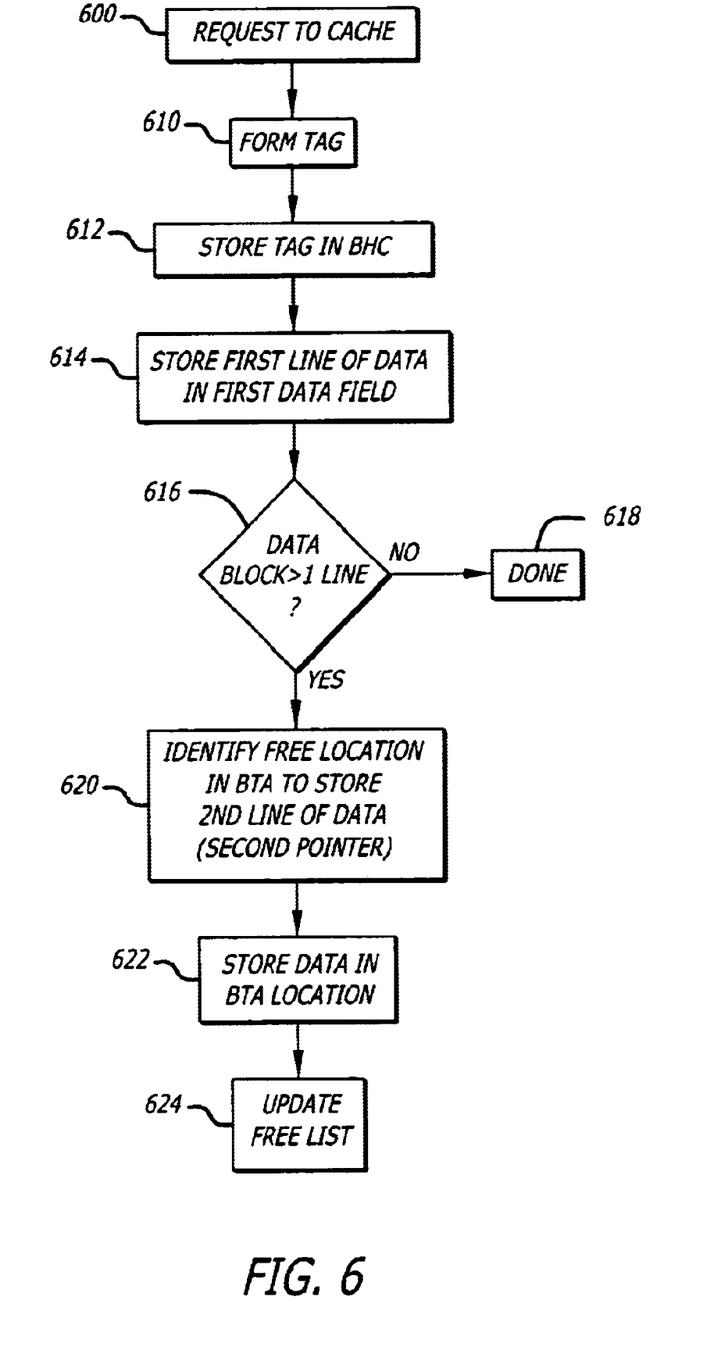
FIG. 6 illustrates a flow chart of a method to write data to an exemplary cache structure.

Referring now to FIG. 6, a flow chart of the operation of cache structure 500 of FIG. 5 is illustrated. In functional state 600, a request to store data in cache structure 500 is made, e.g., by a cache controller device not shown. During functional state 610, a tag is formed to identify a data block to be stored within the cache structure 500. Next, in functional state 612, the tag will be stored in BHC 520 in Tag 522 field. In functional state 614, a first line of the data block is written into First Data 524 in BHC 520. The Second Pointer 526 may be set to indicate that there is additional data stored in BTA 560 at an address pointed to by the Second Pointer 526. However, if the second pointer is not set, then that indicates there is no more data. In other words, there is only one line in that data block. If the length of the data block is greater than one cache line, then the remainder of the data may be stored in the Block Tail Array (BTA) 560. The procedure from this point forward is essentially similar to the write procedure outlined for the cache structure depicted in FIG. 3 (See flow chart in FIG. 4B).

Where the data block length exceeds a single line, in functional state 620, a free block within the BTA 560 is identified. The free block may be identified by a pointer address e.g., Second Pointer 526 and Last Pointer 528 within BHC 520. Accordingly, in functional state 622, the remainder of the data is stored at a location pointed to by Second Pointer 526. The structure of the BTA is similar to that of the BDA 320 in FIG. 3 where the length of the data to be stored exceeds one line in BHC 520.

The advantage of the embodiment illustrated in FIG. 5 is for data blocks containing only one cache line, which need only BHC access, and only one Next Pointer 566 field is wasted.

The insertion of a new block starts from allocation of an entry in BHC 520, using, for example, a Least Recently Used (LRU) algorithm. If a block contains more than one line, an empty line is also allocated in BTA 560, using the FLP 568. During an eviction of a line from BHC 520, the lines pointed by it in BTA 560 are also freed, and appended to a free list of lines using a Last free Lines Pointer (LLP) 570. Thus LLP 570 points to the last line of the newly freed list. The empty lines counter is also updated.

During allocation, in case when there are no more free lines in BTA 560, a random set is chosen in BHC 520, and an LRU block is evicted and all its lines in BTA 560 are put in the free list. This operation is repeated as long as needed. Since this operation is time consuming, and can postpone data fetch process, it can start before reaching the point when there are no more free lines. Using a counter of number of free lines, we can start freeing some blocks using some threshold.

An access starts by BHC 520 look-up and fetch as in a regular cache. In case, the block has more than one line, on the next cycle, a line is fetched from BTA 560 using a pointer without any tag match. Consecutive block lines are fetched from BTA 560 until the end of the block. This is equivalent to the serial cache operation.

The advantages of using the linked list cache over a regular cache that stores a data block in several lines are several fold. First, no tags are wasted since, according to the method pursuant to the invention only a single tag is used for a block of data regardless of what the size of the block is. Thus for example, if a cache line is 8 bytes long, and a given data block is 68 bytes long, instead of using 9 tags (one for each of the 9 cache lines necessary to store the 68 bytes in the data block) only a single tag is utilized. This saving of 8 tags results in reducing the number of ways in the cache which represents reducing power consumption. Alternatively, the reduction in tags results in enabling higher cache hit rate due to increased effective associativity with the same number of ways.

Another advantage of the method pursuant to the invention is that it avoids the case where only part of the block is evicted during a cache miss, leaving live but unreachable lines in the cache. In other words, a block is either entirely contained in the cache or it is not there at all.

What is claimed is:

1. A method comprising:
   storing a tag in a tag cache, said tag referencing a block of data stored in a plurality of line entries in a block data array, the plurality of line entries includes a first line entry and a second line entry, each of the first and second line entries includes (i) data being a portion of said block of data, and (ii) a bit to indicate whether data within said line entry is a last cache line for said block of data;

storing a first pointer in said tag cache that provides an address to said first line entry; and, storing a second pointer in said tag cache that provides an address to said second line entry being said last cache line.

2. The method of claim 1, further comprising:

storing a last pointer in said tag cache to indicate location of a last cache line in said block data array.

3. The method of claim 1, further comprising:

creating a linked list of free lines in said block data array by storing a free lines pointer, a last free lines pointer, and a counter to manage said linked list of free lines.

4. The method of claim 1, wherein said tag cache and said data block array form a trace cache.

5. A method comprising:

receiving a request for a block of data in a cache comprising a tag cache and a block data array;

identifying a tag in said tag cache that corresponds to the requested block of data;

reading a first pointer associated with said tag that points to a first line entry of said block data array;

reading data from said first line entry for said block data array;

reading a second pointer that points to a second line entry of said block data array;

reading data from said second line entry for said block data array; and reading a last bit associated with said second line entry, said last bit to indicate whether said data associated with said second line entry is the last line of data associated with said block of data.

6. The method of claim 5, wherein said cache is a trace cache.

7. The method of claim 5, wherein said cache is a micro-operation cache.

8. An apparatus comprising:

a block tag cache to store a tag, and a first pointer, the tag referencing a block of data;

a block data array to store a second pointer and said block of data including first and second lines of data, said first line of data being referenced by said first pointer and being stored with a bit that, when set, indicates that said first line of data forming a portion of said block of data is a last line of data for said block of data, and said second line of data being referenced by said second pointer and being stored with a bit that, when set, indicates that said second line of data forming a portion of said block of data is a last line of data for said block of data; and, a cache controller to receive a request for said block of data and transfer said block of data upon receving said request.

9. The apparatus of claim 8, wherein said block tag cache and said block data array comprise a trace cache.

10. The apparatus of claim 8, wherein said block tag cache further comprises:

a last pointer to indicate location of a last data line in said block data array.

11. The apparatus of claim 8, wherein the blocked data array further stores a linked list of free line pointer, a last free line pointer, and a counter to manage said linked list of free lines.

12. The apparatus of claim 11, wherein said block tag cache and said block data array form a trace cache.

13. A computer-readable medium including a program executable by a processor, comprising:

a first subroutine to store a tag in a tag cache, said tag referencing a block of data stored in a plurality of line entries in a block data array including a first line entry and a second line entry, each of the first and second line entries includes (i) data being a portion of said block of data, and (ii) a bit to indicate whether data within said line entry is a last cache line for said block of data;

a second subroutine to store a first pointer in said tag cache that provides an address to said first line entry; and, a third subroutine to store a second pointer in said tag cache that provides an address to said second line entry being said last cache line.

14. The computer-readable medium of claim 13, further comprising a fourth subroutine to store a linked list of free lines comprising a free line pointer, a last free line pointer, and a counter to manage said linked list of free lines.

* * * * *

UNITED STATES PATENT AND TRADEMARK OFFICE
CERTIFICATE OF CORRECTION

PATENT NO. : 6,854,033 B2
DATED : February 8, 2005
INVENTOR(S) : Solomon et al.

It is certified that error appears in the above-identified patent and that said Letters Patent is hereby corrected as shown below:

Column 4,
Line 9, delete "property" and insert -- properly --.

Column 8,
Line 21, before "free line", insert -- free lines comprising a --.

Signed and Sealed this

Twenty-fourth Day of May, 2005

JON W. DUDAS
*Director of the United States Patent and Trademark Office*